United States Patent [19]
Ozawa et al.

[11] Patent Number: 5,804,269
[45] Date of Patent: Sep. 8, 1998

[54] HOSE FOR USE IN THE TRANSPORT OF REFRIGERANTS

[75] Inventors: Osamu Ozawa, Hiratsuka; Tetsu Kitami, Hadano, both of Japan

[73] Assignee: The Yokohama Rubber Co., Ltd., Tokyo, Japan

[21] Appl. No.: 878,499

[22] Filed: May 5, 1992

[30]     Foreign Application Priority Data

May 10, 1991 [JP] Japan ................................. 3-105386

[51] Int. Cl.$^6$ ................................. B29D 22/00
[52] U.S. Cl. ................... 428/36.91; 428/36.8; 428/36.9; 428/36.2; 138/124; 138/125; 138/126; 138/127; 138/137
[58] Field of Search ................... 138/124–127, 138/137; 428/36.8, 36.9, 36.91, 36.2; 525/330.7, 331.4, 333.3, 333.5, 333.6, 349, 93, 192, 197, 249

[56]            References Cited

U.S. PATENT DOCUMENTS 4,880,036  11/1989  Kitami et al. ........................... 138/137
4,905,736   3/1990  Kitami et al. ........................... 138/137
5,013,793   5/1991  Wang et al. ............................. 525/197

FOREIGN PATENT DOCUMENTS 0344021  11/1989  European Pat. Off. .

*Primary Examiner*—James J. Seidleck
*Assistant Examiner*—Michael A. Williamson
*Attorney, Agent, or Firm*—Finnegan, Henderson, Farabow, Garrett & Dunner, L.L.P.

[57]            ABSTRACT

A hose useful for handling low temperature fluids such as refrigerants is disclosed, which exhibits excellent resistance to ozone and moisture permeation. A cover or outermost tube of the hose is formed from a vulcanizate of a rubber composition comprising a first copolymer rubber having an isobutylene unit and a p-halogenated methylstyrene unit and/or a second copolymer rubber having an isobutylene unit, a p-halogenated methylstyrene unit and a p-methylstyrene unit.

4 Claims, 2 Drawing Sheets

HOSE FOR USE IN THE TRANSPORT OF REFRIGERANTS

BACKGROUND OF THE INVENTION

1. Field of the Invention

This invention relates to hoses for the transport of refrigerants and other fluids used in air conditioning systems and the like.

2. Prior Art

Hoses used in air conditioners mounted on for instance automotive vehicles are susceptible to permeation of water and/or steam, leading to frozen moisture within the air conditioner unit. To eliminate this problem, it has been proposed to use butyl-based rubber, ethylene/propylene copolymers and other such elastomeric materials for hoses as are highly impervious to water and/or steam.

Butyl-based vulcanizates such as butyl rubber (IIR) and halogenated butyl rubber (Cl-IIR, Br-IIR) are satisfactory in terms of water and/or steam impermeability (hereinafter referred to simply as moisture impermeability), but due to the presence of double bonds in the isoprene unit, they are rather poor in weather-resistance compared to an ethylene/propylene copolymer rubber. Whereas, ethylene/propylene copolymer rubber (EPM, EPDM) is highly weather-resistant due to the absence of double bonds in the main claim but is not so satisfactory in respect of moisture-impermeability compared to butyl-based rubber.

It has been proposed to use rubber compositions comprising both butyl-based rubber and ethylene/propylene copolymer rubber, the resulting vulcanizates however having no appreciable improvement particularly in respect of moisture-impermeability. Thus, there is presently known any rubber material which is truly eligible as one having adequate resistance to both moisture permeation and weather.

SUMMARY OF THE INVENTION

It is therefore a primary object of the present invention to provide a hose for use in the transport of fluids, inter alia refrigerants, which is produced from a rubber composition capable of exhibiting high resistance to weather and permeation of moisture and/or steam.

The above and other objects and features of the invention will become manifest from reading the following description taken in connection with a preferred embodiment, reference being had to the accompanying drawing.

According to the invention, there is provided a hose having at least a core tube, a reinforcing layer and a cover tube, at least said cover tube being formed from a vulcanizate of a rubber composition (C) comprising a copolymer rubber (A) having an isobutylene unit and a p-halogenated methylstyrene unit and/or a copolymer rubber (B) having an isobutylene unit, a p-halogenated methylstyrene unit and a p-methylstyrene unit.

BRIEF DESCRIPTION OF THE DRAWINGS

The present invention will now be described more fully, with reference to the accompanying drawings wherein.

DETAILED DESCRIPTION OF THE INVENTION

Figure 1:
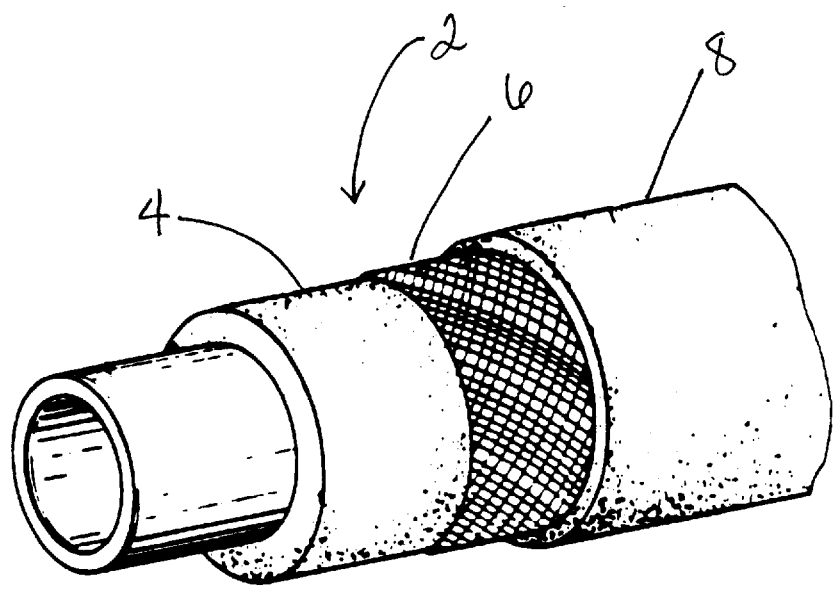
FIG. 1 is a perspective view of a hose in accordance with the present invention.

A rubber composition (C) according to the invention comprises a copolymer rubber (A) identified by formula (I) below and having an isobutylene unit and a p-halogenated methylstyrene unit and/or a copolymer rubber (B) identified by formula (II) and having an isobutylene unit, a p-halogenated methylstyrene unit and a p-methylstyrene unit

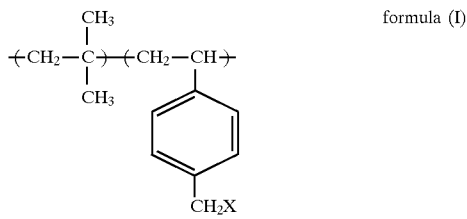

wherein X is a halogen atom.

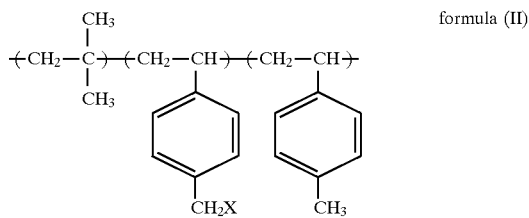

wherein X is a halogen atom.

The above copolymer rubbers (A) and (B) can be obtained by halogenating the methyl groups in the p-methylstyrene unit of an isobutylene/p-methylstyrene copolymer rubber represented by formula (III) below.

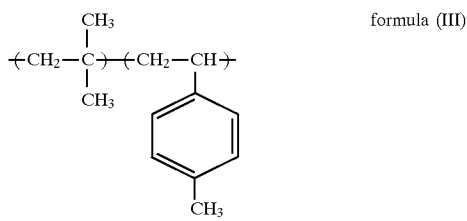

The proportion of p-halogenated methylstyrene unit in copolymer rubber (A) and the proportion of the sum of p-halogenated methylstyrene unit and p-methylstyrene unit in copolymer rubber (B) are preferably in the range of 1–20 percent by weight, more preferably in the range of 1–15 percent by weight of the respective copolymers. Proportions of these units less than 1 percent by weight would mean less halogenated methyl groups, hence too little cross-linkable moieties, leading to insufficient post-vulcanization elastic modulus, whereas proportions exceeding 20 percent by weight would result in undue rise in the glass transition temperature and reduced freeze resistance of the vulcanizates.

Halogen contents in the respective copolymer rubbers (A) and (B) are preferably in the range of 0.2 to 2.2 percent by weight, more preferably in the range of 0.8 to 2.0 percent by weight. Less than 0.2 weight percent halogen contents would represent insufficient cross-linkable moieties, leading to reduced post-vulcanization elasticity, whereas greater than 2.2 percent halogen contents would result in reduced scorch time, unreacted halogen residues after vulcanization and declined thermal aging resistance of the vulcanizates.

It is preferable to use copolymer rubber (A) or (B) which contains bromine atoms in particular from amongs other halogen atoms.

Copolymer rubbers (A) and (B) are believed to undergo cross-linking reaction at their respective p-halogenated methylstyrene moieties, as represented by formula (IV), through the medium of certain vulcanizing agents hereafter described.

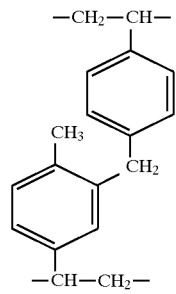

formula (IV)

The isobutylene units in copolymer rubbers (A) and (B) contribute to enhanced moisture impermeability of the hose. Both copolymer rubbers are free of double bonds in the main chain, hence less reactive, leading to high resistance to weather, particularly to ozone and are therefore, when vulcanized, highly resistant to moisture and weather.

A copolymer rubber eligible for the purpose of the invention may be typically exemplified by a product tradenamed XP-50 of Exxon Chemical Company (a bromide of an isobutylene-para-methylstyrene copolymer) and is introduced in a literature entitled "A meeting of the Rubber Division, American Chemical Society (ACS), Washington, D.C., Oct. 9–12, 1990, ISOBUTYLENE-BASED POLYMERS IN TIRES-STATUS AND FUTURE TRENDS, by J. V. Fusco AND D. G. Young, Exxon Chemical Company".

The rubber composition (C) used in the invention is comprised chiefly of copolymer rubbers (A) and (B) but may further contain a limited amount of other suitable polymers such as butyl-based rubber, ethylene/propylene copolymer rubber and the like.

The vulcanizing agent to be used in the invention includes sulfur, quinone dioxime, modified alkylphenol resin, zinc oxide/stearate, zinc stearate, other metal stearate, zinc salts of dithiocarbamate, and thiuram/thiazole. These vulcanizing agents may be used in an amount dependent upon their peculiar characteristics.

The rubber composition (C) according to the invention may contain, if desired, suitable additives such as fillers, reinforcing agents, plasticizers, antioxidants, processing aids, pigments and the like. The rubber composition (C) may find useful application for steam hoses where high moisture resistance is required.

Referring to FIG. 1, the inventive hose 2 for use particularly in the transport of refrigerants is made up of at least a core tube 4, a reinforcing layer 6 and a cover tube 8. The cover tube in particular is formed from the rubber composition (C) and is usually about 1.0 mm–2.0 mm thick. The core tube may be formed from a vulcanizate of such a rubber composition which is vulcanizable under conditions similar to these for the rubber composition (C). The core tube is surrounded by a reinforcing layer of high strength yarns such as rayon and polyester yarns. The hose contemplated hereunder may further comprise other intermediate layers if desired. In any case, however, it is important for the purpose of the invention that the outermost layer of the covet tube is formed from a vulcanizate of the rubber composition (C). Certain preferred hose structures are disclosed in Japanese Laid-Open Patent Publication Nos. 63-125885 and 63-302036.

The inventive hose may be fabricated by any known means. For example, the core tube is formed by extension of a resin and a rubber composition onto a mandrel coated with a releasing agent and knitted thereover with suitable reinforcing yarns, followed by extrusion of the rubber composition (C). The resulting tubular body is then subjected to press vulcanization at 130°–170° C., preferably 140°–160° C., and allowed to cool, followed by withdrawal of the mandrel.

The invention will be further described by way of the following examples.

Preparation of Vulcanizates

Each of the rubber compositions shown in Table 1, 2 and 3 was kneaded and subjected to press vulcanization at 160° C. for 30 minutes until there was produced a sheet of vulcanized rubber.

Ozone-Resistance Test (Vulcanizates)

The procedure of JIS K6301 was followed. The various rubber sheets obtained as above were stretched at 60% elongation and exposed to an atmosphere of 100 pphm ozone at 50° C. Observation was made for cracks or ruptures every 24 hours over 168 hours.

Moisture Impermeability Test (Vulcanizates)

Figure 2:
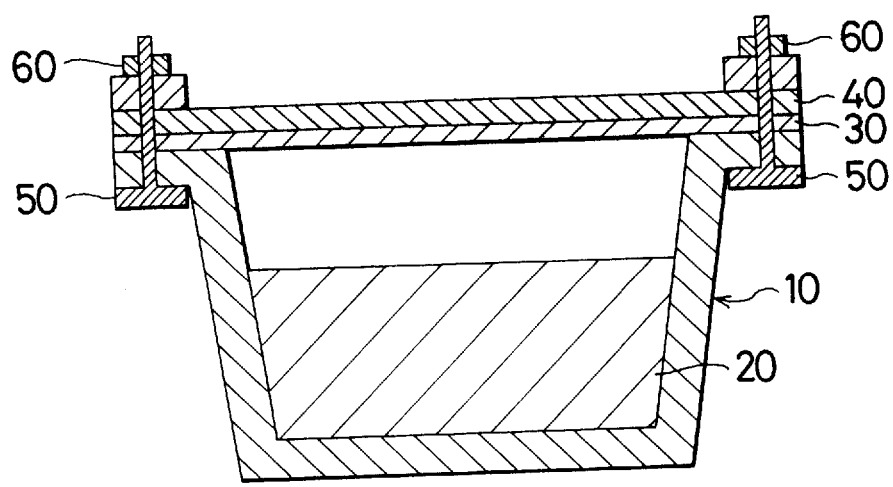
FIG. 2 is a cross-sectional view of apparatus for conducting a moisture impermeability test for sheet rubber.

This test was made with use of an apparatus shown in FIG. 2 which comprises a stainless steel cup 10, filled halfway with water 20. A sample of each of the above rubber sheets 30 was placed over the cup 10, overlaid by a sintered metal plate 40 and secured in place by tightening bolts 50 and nuts 60. The sample 30 was disposed at an atmosphere of 80° C. and examined for loss of weight every 24 hours. Moisture permeability was determined by the equation $$\text{Moistured Permeability}(mg \cdot mm/24\ h \cdot cm^2) = \frac{M \cdot t}{T \cdot A}$$

where
  $A\ (cm^2)$ is an area of permeation;
  $T$ (day) is a total of hours tested;
  $M$ (mg) is a loss of weight; and
  $t$ (mm) is a thickness of each test sample.

The results of the above tests are shown in Table 4, from which it is seen that the inventive rubber compositions ($C_1$ and $C_2$) are satisfactory in respect of both ozone resistance and moisture impermeability properties, whereas control ($Y_4$) and controls ($Y_1$, $Y_2$ and $Y_3$) are satisfactory only in respect of either, not both, of the desired properties.

Fabrication of Hoses

A polyamide resin was extended to a thickness of 0.2 mm over a mandrel measuring 11 mm in diameter. Over the resulting inner resinous tube was extruded a control rubber composition ($Y_1$) to an outside diameter of 14.5 mm. The thus extruded rubber tube was knitted thereover with a layer of polyester reinforcing yarns, followed by extrusion of each of the rubber compositions of Tables 1–3 to an outside diameter of 19.0 mm to form a cover or outermost tube. This tube was coated with lead and vulcanized in steam at 160° C. for 60 minutes. After removal of lead, the mandrel was pulled out to produce a test sample hose.

Ozone Resistance Test (Hoses)

The procedure of JIS K6330 was followed. Each sample hose was wound on a cylindrical tube having an outer diameter 6 times larger than that of the hose. It was exposed to an atmosphere of 100 pphm ozone at 50° C. and checked for cracks or rupturers after a lapse of 168 hours.

Moisture Impermeability Test (Hoses)

Each sample hose was placed in an oven at 50° C. for 5 hours, followed by introduction of a desiccant (molecular sieves 3A) in an amount equivalent to 80% volume of the hose. The oven was hermetically sealed. The hose was then exposed to an atmosphere of 95% RH and 50° C. The desiccant was examined for changes in weight, the amount of moisture absorbed being determined by conversion to mg/cm$^2$/24 H.

The results of the above tests are shown in Table 5 from which it is seen that the hoses incorporating rubber compositions ($C_1$ and $C_2$) for the cover tubes are satisfactory in respect of both ozone resistance and moisture impermeability properties, whereas the hoses incorporating rubber compositions of control ($Y_4$) and controls ($Y_1$, $Y_2$ and $Y_3$) are satisfactory only in respect of either, not both, of the desired properties.

TABLE 1

Rubber Compositions (C) for Hose Cover Tube

|  | $C_1$ | $C_2$ |
|---|---|---|
| copolymer rubber | 100.0 | 100.0 |
|   isobutylene (weight %) | 94.0 | 90.5 |
|   p-methylstyrene (weight %) | 5.0 | 7.5 |
|   bromine (weight %) | 1.0 | 2.0 |
| HAF carbon black *$^1$ | 50.0 | 50.0 |
| AC polyethylene | 5.0 | 5.0 |
| softening agent *$^2$ | 10.0 | 10.0 |
| chinese white | 0.5 | 0.5 |
| stearic acid | 2.0 | 2.0 |
| zinc stearate | 1.0 | 1.0 |

TABLE 2

Control Rubber Composition (Y)

|  | $Y_1$ | $Y_2$ | $Y_3$ |
|---|---|---|---|
| butyl rubber *$^3$ | 100.0 | | |
| chlorinated butyl rubber *$^4$ | | 100.0 | |
| brominated butyl rubber *$^5$ | | | 100.0 |
| HAF carbon black *$^1$ | 80.0 | 50.0 | 50.0 |
| AC polyethylene | 5.0 | 5.0 | 5.0 |
| softening agent *$^2$ | 10.0 | 10.0 | 10.0 |
| chinese white | 3.0 | 5.0 | 3.0 |
| stearic acid | 3.0 | 1.0 | 1.0 |
| brominated alkylphenol resin *$^6$ | 8.0 | | |
| Accelerator TT *$^7$ | | 1.5 | |
| Accelerator DM *$^8$ | | 1.5 | 1.3 |
| sulfur | | | 0.5 |

TABLE 3

Control Rubber Composition (Y)

|  | $Y_4$ |
|---|---|
| ethylene/propylene copolymer rubber (EPDM) *$^9$ | 100.0 |
| FEF carbon black *$^{10}$ | 90.0 |
| chinese white | 5.0 |
| stearic acid | 1.0 |
| softening agent *$^2$ | 35.0 |
| sulfur | 1.0 |
| Accelerator CZ *$^{11}$ | 2.0 |
| Accelerator TT *$^7$ | 0.5 |

*$^1$Showblack N330, Showa Cabot Co., Ltd.
*$^2$Machine Oil 22, Showa Shell Oil Co., Ltd.
*$^3$Exxon Bytyl 268, Exxon Chemical Company
*$^4$Chlorobutyl 1066, Exxon Chemical Company
*$^5$Exxon Bromobutyl 2255, Exxon Chemical Company
*$^6$Tackyroll 250-I, Taoka Chemical Co., Ltd.
*$^7$Nocceler TT, Ohuchi Shinko Kagaku Co., Ltd. tetramethylthiuram disulfide
*$^8$Nocceler DM, Ohuchi Shinko Kagaku Co., Ltd. dibenzothiazyl sulfide
*$^9$Mitsui EPT 4070, Chubu Carbon Co., Ltd.
*$^{10}$HTC #100, Mitsubishi Petrochemical Industries Ltd.
*$^{11}$Nocceler CZ-G, Ouchi Shinko Kagaku, Co., Ltd. N-cyclohexyl-2-benzothiazyl sulfeneamide

TABLE 4

Test Results on Vulcanized Rubber Sheets

|  | Inventive Examples | | Comparative Examples | | | |
|---|---|---|---|---|---|---|
|  | 1 | 2 | 1 | 2 | 3 | 4 |
| rubber composition | $C_1$ | $C_2$ | $Y_1$ (IIR) | $Y_2$ (Cl-IIR) | $Y_3$ (Br-IIR) | $Y_4$ (EPDM) |
| ozone resistance test | 168 H no cracks | 168 H no cracks | 24 H cracked | 24 H cracked | 24H cracked | 168H no cracks |
| moisture impermeability test (mg · mm/24 H · cm$^2$) | 1.5 | 1.5 | 1.5 | 1.5 | 1.5 | 4.0 |

TABLE 5

| | Test Results on Hoses | | | | | |
|---|---|---|---|---|---|---|
| | Inventive Examples | | Comparative Examples | | | |
| | 1 | 2 | 1 | 2 | 3 | 4 |
| cover tube rubber composition | $C_1$ | $C_2$ | $Y_1$ (IIR) | $Y_2$ (Cl-IIR) | $Y_3$ (Br-IIR) | $Y_4$ (EPDM) |
| ozone resistance test | no cracks | no cracks | cracked | cracked | cracked | no cracks |
| moisture impermeability test ($mg/cm^2/24$ H) | 0.1 | 0.1 | 0.1 | 0.1 | 0.1 | 0.4 |

What is claimed is:

1. A hose for use in the transport of refrigerants and having high resistance to weather and moisture, said hose having at least a core tube, a reinforcing layer over said core tube and a cover tube over said reinforcing layer, at least said cover tube being formed from a vulcanizate of a rubber composition comprising a first copolymer rubber having an isobutylene unit and a p-halogenated methylstyrene unit, a second copolymer rubber having an isobutylene unit, a p-halogenated methylstyrene unit and a p-methylstryrene unit or a mixture of said copolymer rubbers, and wherein the proportion of said p-halogenated methylstyrene unit in said first copolymer rubber and the proportion of the sum of p-halogenated methylstyrene unit and p-methylstyrene unit in said second copolymer unit is 1–20 percent by weight of the respective copolymer rubbers.

2. A hose according to claim 1 wherein said first copolymer rubber is represented by the formula

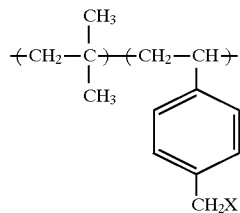

formula (I)

wherein X represents a halogen atom.

3. A hose according to claim 1 wherein said second copolymer rubber is represented by the formula

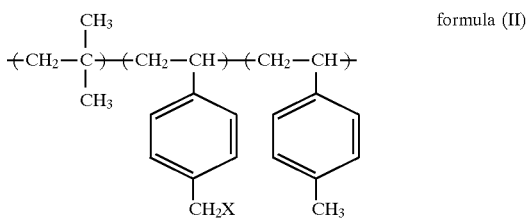

formula (II)

wherein X represents a halogen atom.

4. A hose according to claim 2 or 3 wherein said first and second copolymer rubbers each contains 0.2–2.2 percent by weight of halogen.

* * * * *